(12) United States Patent
Douglas

(10) Patent No.: US 7,414,854 B1
(45) Date of Patent: Aug. 19, 2008

(54) BATTERY-BACKED COMPUTER SYSTEM WITH EXTERNALLY REPLACEABLE BATTERY MODULE

(75) Inventor: Robert Danhieux Douglas, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 790 days.

(21) Appl. No.: 10/965,132

(22) Filed: Oct. 14, 2004

(51) Int. Cl.
*H05K 5/00* (2006.01)
(52) U.S. Cl. ..................... 361/752; 361/800
(58) Field of Classification Search ............ 361/752, 361/790, 799, 797, 800, 756, 727, 737, 754, 361/759; 312/223
See application file for complete search history.

(56) References Cited

U.S. PATENT DOCUMENTS

| | | | | |
|---|---|---|---|---|
| 5,251,109 A | * | 10/1993 | Baitz | 361/796 |
| 5,421,737 A | * | 6/1995 | Chen et al. | 439/157 |
| 6,058,025 A | * | 5/2000 | Ecker et al. | 361/816 |
| 2002/0080541 A1 | * | 6/2002 | Bunker et al. | 361/72 |

* cited by examiner

*Primary Examiner*—Hung S Bui
(74) *Attorney, Agent, or Firm*—William J. Kubida; Michael C. Martensen; Hogan & Hartson LLP

(57) ABSTRACT

A battery-backed cache system with a pluggable battery module. The system includes a RAID controller and a cache. A back up power board is provided upon which a second power connector is provided and the two power connectors are connected. A socket assembly is mounted on the board and is connected to the second power connector. The socket assembly is a standard socket for use with PC Cards and includes a bulkhead adapter for mounting to a case wall with a slot of the socket assembly accessible through the case wall. A battery module is included having a body with dimensions corresponding to the slot. A battery is positioned within the body and a connection interface is provided in the battery module for mating with the socket assembly. The body and connection interface of the battery module comply with PCMCIA specifications for card bodies and interfaces.

11 Claims, 4 Drawing Sheets

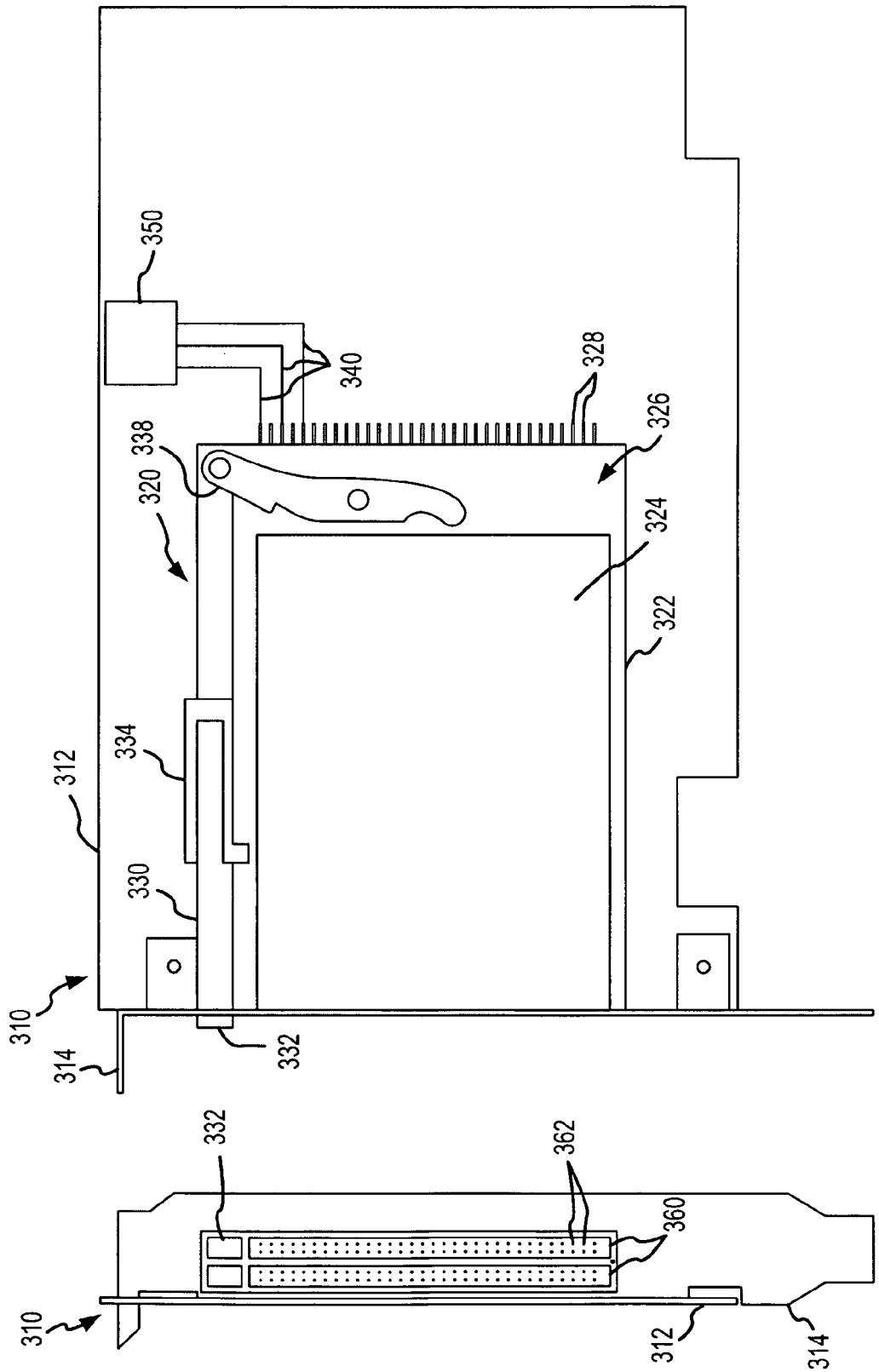

BATTERY-BACKED COMPUTER SYSTEM WITH EXTERNALLY REPLACEABLE BATTERY MODULE

FIELD OF THE INVENTION

The present invention relates, in general, to batteries and providing power to computer components with batteries, and, more particularly, to a cache power assembly for providing power to a data cache having back up power provided with a battery. The cache power assembly is adapted to be pluggable and also, typically, to be hot swappable.

BACKGROUND

The protection and availability of data is an ongoing and growing concern in the computer industry. An increasingly common method of protecting data, such as configuration data or received instructions, is to provide a data cache for processors and controllers. To protect the data, the cache is provided power not only from system power sources but also a battery dedicated to the cache. This arrangement is typically referred to as "battery-backed cache" and is used to protect cached data in the event of a power outage or equipment failure, such as failure of a server, a processor, or a controller. For example, RAID (Redundant Arrays of Inexpensive Disks) controllers are typically designed to use a cache to store data in read-ahead, write-back, and other operations, and the RAID controller cache is battery-backed to retain the data during a system or power failure to allow later completion of these operations when the system restarts. In RAID and other similar systems, data availability is the overriding design concern with cost being a secondary issue, and nearly any system improvement that enhances uptime and data availability is not only useful but compelling.

While protecting data, existing battery-backed cache systems are difficult to maintain. In RAID controller systems, the battery used to provide back up power for the RAID controller cache generally has to be replaced periodically, e.g., every 1 to 3 years. In standard arrangements, the cache battery is provided on the same card or board as the RAID controller within the case or housing that structurally holds or encloses the RAID controller system. To replace the cache battery, the RAID controller system must be powered down, which requires scheduling of the maintenance as the RAID controller is unavailable during battery replacement. Then, the computer or device housing is disassembled to allow removal of the RAID/cache battery board, such as by unplugging the board from the system backplane. The battery is unscrewed or otherwise removed from the board or card, replaced with a new battery, the board or card is reinserted into the case or the backplane, and the case or housing is reassembled. The complexity of the battery replacement generally requires a technician to properly service the battery-backed cache system.

Hence, there remains a need for an improved cache battery module or system that facilitates replacement of a cache battery or other battery used to provide back up power for a computer component. Preferably, such a module or system would be adapted to reduce or eliminate the need for powering down the host or processor system. Further, it is preferable that the module or system be configured to allow customer replacement of the cache or back up battery.

SUMMARY OF THE INVENTION

The present invention addresses the problems associated with computer devices, such as RAID controllers, that use batteries as a source of back up power but that require a power shut down to replace the batteries and often also require partial disassembly of a case or housing. The present invention provides a battery-backed system that enables non-disruptive battery replacement. The battery-backed system generally includes a back up power board or card that includes a socket assembly mated with an external wall of a case or housing and the board or card is adapted for insertion within a system board, such as a PCI board or a backplane. For example, the board or card may be a CPU motherboard, a PCI card, a PCI-x card, other removable circuit card or board, or the like. The socket assembly is configured for receiving a battery module that has a standardized form factor and configuration, and in one embodiment, the battery module includes one or more batteries connected to selected pin leads of a card interface and is adapted to comply with PC or Express Card standards, such as the PCMCIA PC Card specifications. In this embodiment, the socket assembly can be a standard card socket with the battery module being received in and ejected from a standard socket, such as a PCMCIA-defined socket.

More particularly, a computer system is provided that is configured for hot swapping a battery module used to provide back up power to a system component, such as a data cache device. The system includes a housing or case for structurally supporting and enclosing system components. A back up power board is positioned within the housing, and a battery power connector is printed or otherwise provided on this board. A processor board is also positioned within the housing proximal to the back up power board, and the processor board includes a back up power connector linked to the battery power connector, such as with a wire supported with a power harness. A processor, such as a RAID controller, and a system component, such as a cache, are mounted on the processor board. The system component is typically controlled by the processor.

A socket assembly is included in the system and is mounted on the back up power board. The socket assembly includes a slot for receiving the battery module, a connection interface adjacent the slot, and an adapter for mating with a wall of the housing such that the slot is accessible from outside the housing (e.g., through the wall). The connection interface comprises pins for mating with a pin receptacle end of a battery module and leads connected to the battery power connector and to a set of the pins. The socket assembly includes a mechanism for ejecting a received battery module including a release button protruding outward from the housing wall. In one embodiment, the battery module is manufactured to comply with PCMCIA PC Card, Express Card, or other "card" specifications for external form factor (e.g., dimensions, configuration, and the like) and for interconnection. The battery module includes a battery or battery assembly connected to the pin receptacle end of the module. In this embodiment, the slot is configured for receiving PCMCIA PC Cards or Express Cards.

According to another aspect of the invention, a battery module is provided for use with a computer system housed within a case having an externally accessible battery socket. The battery module includes a body having sides and walls with interior surfaces defining an enclosed space. The body has an external form factor selected to allow the body to mate with the battery socket. The battery module further includes a battery or batteries positioned within the enclosed space of the body. A connection interface is provided adjacent the enclosed battery space. The connection interface includes leads connected to a plurality of pin receptacles that face outward from the body (e.g., are positioned on an external surface of the body). The battery is connected to a set of the leads. The body and the connection interface are configured to meet or exceed specifications set forth by the PCMCIA for a card, such as a Type I, II, III, or IV PC Card or an Express Card. The body has an external form factor which allows it to be received in a standard card slot, such as a slot of a PCMCIA socket, and in one embodiment, the external form factor includes a thickness of less than about 18 mm and a width of less than about 54 mm.

BRIEF DESCRIPTION OF THE DRAWINGS

FIGS. 3A and 3B illustrate side and end views of a cache back up power card or board configured for mounting on a system board, such as a PCI board, to allow access via a bulk head adapter to a standard card slot that is used to receive a plug-in battery module, such as a PC or Express card especially adapted with one or more batteries connected to selected pins of the card.

DETAILED DESCRIPTION OF THE PREFERRED EMBODIMENTS

The present invention is directed to a hot swap, plug-in battery module for use with battery-backed systems, such as systems with, but not limited to, RAID controllers or other processors that utilize data caches with batteries as back up power sources. The battery modules include one or more batteries provided in a sealed package with a standard form factor that is configured for insertion and removal from the battery-backed system without powering down the system and without disassembly of a case or housing enclosing the system components.

In one embodiment, this is achieved by utilizing industry standards for a "card" and a card socket. The battery module is fabricated by modifying a standard card to include a battery assembly and by wiring the card socket assembly to connect to a power connector on a back up power card or board. The back up power connector is in turn wired or connected to the cache or other device requiring battery power as a back up power source. In this manner, and as described in detail below, replacement of a battery used to back up a cache, such as for a RAID controller, or other system component can be accomplished by nearly anyone without the assistance of a trained technician. The old battery can be ejected from the system case or housing by pushing a release button of the card socket assembly, and the new battery can be provided by inserting or plugging in a new battery module into the card socket assembly mounted on the back up power board.

Figure 1:
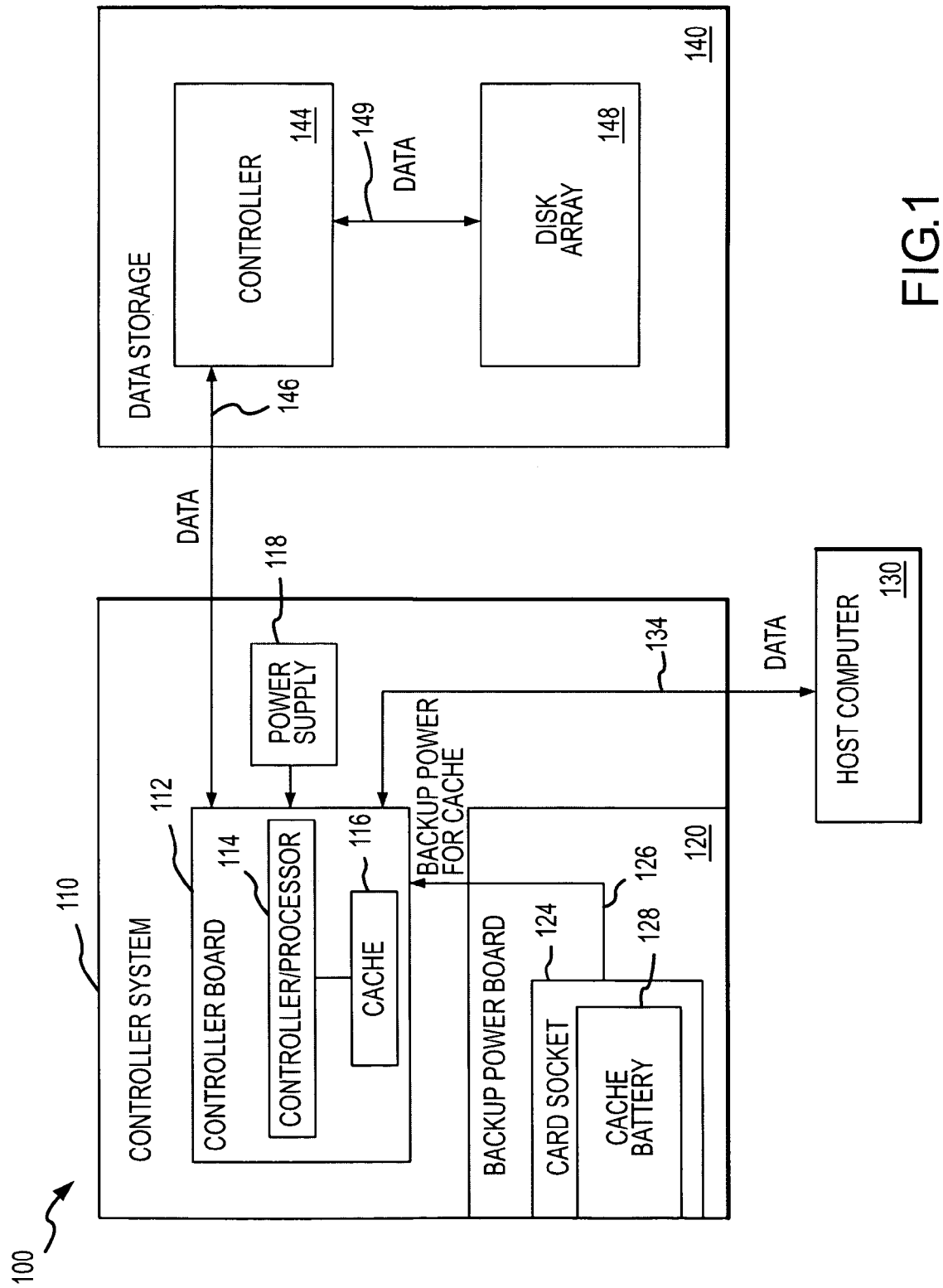
FIG. 1 illustrates in simplified block diagram form a battery-backed cache system according to the present invention including a hot swap, plug-in cache battery module.

The following description begins with a description of battery-backed system 100 with reference to FIG. 1 that generally describes the broader aspects of the invention. For example, the system 100 may be a data management system utilizing a RAID controller with a battery-backed cache. The invention allows a cache battery to be hot swapped to maintain RAID controller and data availability. After the general discussion of system 100, the description continues with an exemplary implementation of the invention with reference to FIGS. 2A-4 in which a back up power assembly is shown that provides a battery module 210 and a card slot that are adapted to comply with PCMCIA guidelines and standards. The battery module 210 may comply with (i.e., have a defined form factor and configuration) any PC Card or other card guideline (such as an Express Card) established presently or in the future, such as by the PCMCIA or other standards organization. As will become clear, the battery module 210 is particularly well suited for providing a hot swappable, externally pluggable battery for a cache used by a RAID controller. It will be understood, however, that the invention is well suited for use with any device in which battery power is utilized in a computer system and for which the battery requires periodic replacement (particularly, with the system still operating or powered up).

FIG. 1 illustrates one embodiment of a battery-backed system 100 utilizing a back up power assembly or board (or card) 120 configured according to the invention. In the following discussion, computer and network devices, such as the software and hardware devices within the system 100, are described in relation to their function rather than as being limited to particular electronic devices and computer architectures and programming languages. To practice the invention, the software and hardware devices may be any devices useful for providing the described functions. Data, including transmissions to and from the elements of the system 100 typically is communicated in digital format following standard communication and transfer protocols, such as TCP/IP, HTTP, HTTPS, FTP, and the like, or IP or non-IP wireless communication protocols such as TCP/IP, TL/PDC-P, and the like.

The system 100 may be implemented by utilizing standard PC Card or similar standards which facilitate providing a useful form factor for an externally pluggable and ejectable battery module. For example, the system 100 may be implemented using the components shown in FIGS. 2A-4, which are configured to comply with standards and definitions established by the PCMCIA. PCMCIA stands for Personal Computer Memory Card International Association, with PCMCIA being the name of both the underlying technology and the committee that develops the specifications for that technology. PCMCIA PC Cards are typically referred to more simply as "PC Cards", and in several embodiments of the invention, the cache battery or battery module takes the external form factor of a PC Card (or a more recently defined PCMCIA Express Card) and uses the connection interfaces (e.g., pins, leads, and the like) of a PC Card. The inventor recognizes that the PCMCIA specifications may be modified in the coming years or that new standards for "cards" may be developed, but the inventor believes that the breadth of the description will cover such changes and advances. PCMCIA technology is utilized in several implementations of the invention due to its widespread use and acceptance within the computer industry and not as a limitation to the invention.

Referring to FIG. 1, the battery-backed system 100 includes a controller system 110, a host computer 130, and data storage 140. The data storage 140 includes a controller 144 and a disk array 148 (such as a RAID) and the controller 144 communicates data over communication link 149. The controller system 110 transmits and receives data and instructions to and from host computer 130 over communication link 134 (e.g., a PCI bus or other link), and in turn, the controller system 110 transmits data (such as instructions, data for storage, retrieved data, and the like). Additionally, the controller system 110 communicates data to and from the data storage 140 via link 146 (a SCSI connection, for example). The controller system 110, data storage 140, and host computer 130 may take many forms to practice the invention and additional data storage, host computers, and/or other computer/network devices may be included in the system 100 to practice the invention. In one embodiment, the controller system 110 includes a RAID controller (see, controller 114) and data storage 140 comprises one or more RAID systems. The controller system 110 is shown as a standalone device, e.g., housed in a separate case or housing, but the host computer 130 may be included in the same case or housing in some embodiments.

As noted above, the controller system (or computer system) 110 typically is enclosed within a single case or housing. Within this case (not shown in this logical diagram but well known in the art), the system 110 includes a controller or processor 114 that is powered in standard operations by a power supply 118. Data, such as that received from host computer 130 and/or data storage 140, is stored at least in part in a cache 116. The cache 116, as is the processor or controller 114, is powered by the power supply 118 during standard operations, but the system 110 further includes a cache battery 128 inserted in a card socket 124 for providing back up power for the cache 116 when the controller 114 fails, the power supply 118 fails, or otherwise there is an interruption to power for the cache 116. Power for the cache 116 is provided from the cache battery 128 over power connection 126.

During exemplary operation, the controller, such as a RAID controller, 114 monitors the cache battery 128 via power connection 126 that is connected to the card socket. When battery 128 is below a certain power level, the controller 114 switches from the battery 128 (and/or shuts down cache operations) so that the battery 128 can be replaced. Note, the system 110 and controller 114 are not powered down. The cache battery 128 is replaced by ejecting the cache battery 128 via operation of the card socket 124 (as explained in more detail with reference to FIGS. 3A and 3B). A charged or new cache battery 128 is inserted into the card socket 124, which results in the battery 128 being connected to the socket 124 and hence, line 126 and controller 114. The controller 114 senses the presence of the replacement cache battery 128 and when the battery 128 is above a minimum voltage, the controller 114 provides battery or back up power to the cache 116. The replacement of the cache battery 128 does not require either powering down the system 110 or disassembly of a case or housing in which the controller 114 and cache 116 are positioned. Hence, the cache battery 128 is adapted for hot swapping and is externally pluggable (as will become clearer with reference to FIGS. 2A-4).

As shown, the controller 114 and cache 116 are mounted or provided in the system 110 on a controller board or card 112 (e.g., a printed circuit board typical of most computer systems), which typically would be mounted on a backplane or other circuit board to connect the controller board to one or more communication busses in system 110 and power supply 118. The controller 114 typically would be accessible via a wall or surface of the case enclosing the system 110, such as via a bulkhead that has one or more ports or connection adaptors. Through such a bulkhead communication connections are typically made by plugging lines, such as lines 134, 146, into a communication receptacle or plug in (not shown).

Similarly, according to one feature of the invention, the back up power for the cache 116 is provided on a back up power board or card 120. The board 120 in one embodiment comprises a typical card or board substrate that can be plugged into or inserted into the backplane or other surface within the system 110 case, e.g., adjacent or near the controller board 112. On the board 120, the card socket or socket assembly 124 is mounted. Preferably, the card socket 124 is mounted so as to abut or protrude partially through the bulkhead of the case enclosing the system 110. In this manner, the card socket 124 is accessible from the exterior portions of the system 110 so as to avoid the need for disassembling a case or housing enclosing the boards 112, 120.

The card socket 124 is adapted for mating with a cache battery or battery module 128 so as to allow electricity to flow from the battery 128 (or from one or more batteries provided in the cache battery module or assembly) through the card socket 124 to battery power connection 126 and cache 116. As shown in FIGS. 2A-3B, the card socket 124 includes mechanical components for selectively ejecting or releasing the cache battery 128 from the socket 124 to allow easy replacement. Also, the cache battery 128 preferably includes a body or housing that has a form factor that matches openings or slots in the card slot 124 and one or more batteries housed or sealed within such a body or housing. For example, the cache battery 128 may include a body or housing configured as a Type I, II, or III PC Card or an Express Card per PCMCIA specifications and the card socket 124 may be a PCMCIA socket adapted for receiving one or more Type I, II, or III PC or Express Cards.

Figures 2A, 2B:
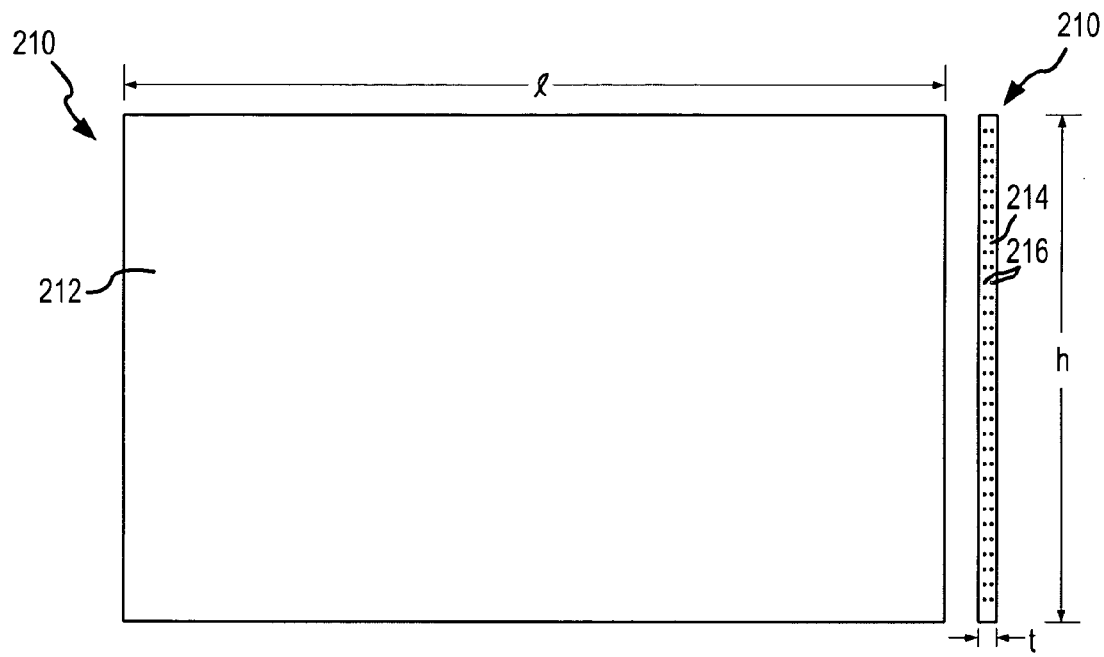
FIGS. 2A-2C illustrate side and end views of an exemplary battery module that may be used to provide externally insertable and replaceable back up power for a cache and may be used in the system of FIG. 1.
Figure 2C:
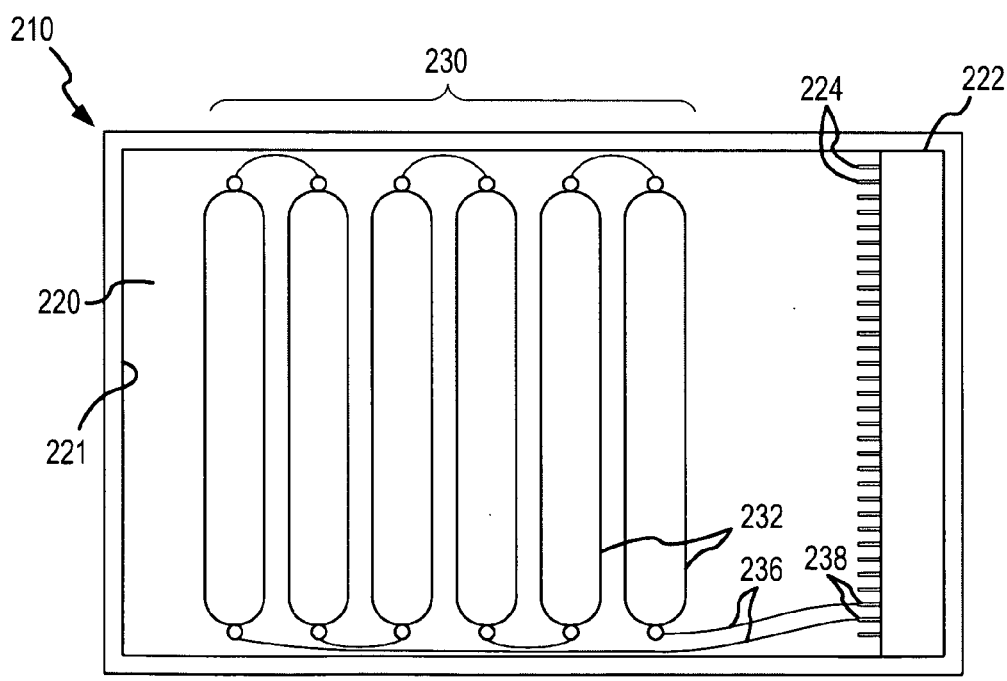

One embodiment of a battery module 210, such as may be used for cache battery 128, is shown in FIGS. 2A-2C. The battery module 210 is labeled "PC Card Battery Module" and in some embodiments, the module 210 is configured to meet at least the external form factor, body or housing strengths and materials, and connection specifications of a PC Card (or Express Card or other industry standard card). In this regard, the battery module 210 includes a body or housing 212 that has a thin rectangular box form with a length l, a height h, and a thickness t. On a receptacle end 214, a number of pin receptacles 216 are provided to allow the module 210 to mate with and be connected with a card slot (such as card slot assembly 320 shown in FIGS. 3A and 3B).

FIG. 2C shows the module 210 with a wall or cover removed to show the internal components of the module 210. Particularly, inside the body or housing 212, a battery assembly 230 is provided that includes a number of serially connected batteries 232. In other embodiments, a larger or smaller number of batteries are used to form the battery assembly 230, e.g., 1 to 10 or more, with the number or design of the batteries not being a significant limitation of the invention as long as the batteries 232 are selected to have a thickness of less than about the thickness, t, of the body or housing 212. Further, the batteries 232 may be rechargeable batteries, smart batteries (e.g., have integrated electronics), or take any other useful form for use with a computer or other electronic device and may include other circuitry and/or intelligence as needed for these alternative battery configurations or forms. The module 210 includes an inner surface 220 upon which the batteries 232 are mounted or attached. A wall 221 is provided to define the interior space or volume in which the battery assembly 230 is positioned and the wall 221, with a height of about thickness, t, extends about the periphery of the surface 220 so that when the removed cover (not shown) is attached the batteries 232 are sealed or enclosed within the battery module 210.

The battery module 210 further includes a connector or connection interface 222 which includes the pin receptacles 216 and connectors or leads 224 to which components within the module 210 can be connected to provide an interface with devices plugged into receptacles 216 (i.e., the number of leads 224 typically matches the number of pin receptacles 216). The batteries 232 are connected via lines or wires 236 to leads 238, and as a result, power from the batteries 232 is provided to receptacles 216 connected to these same leads 238.

As discussed above, the battery module 210 is preferably manufactured to comply with an industry standard for externally pluggable cards. Particularly, in some embodiments, the battery module 210 is a PC Card or Express Card complying with PCMCIA standards so that the module 210 can be inserted into and connect with a card socket fabricated according to PCMCIA specifications for similar cards. Specifically, PCMCIA specifications define pin numbers (e.g., 68 leads and pins), pin locations, and typical pin assignments for mating with a PCMCIA socket, bus, and controller. In the present invention, standard card pins are used for connection to the batteries 232 to allow connection with a PCMCIA-compliant socket (such as that shown in FIGS. 3A and 3B) but the PCMCIA does not define providing power with a PC Card or assign any pins for such a function and the choice of leads 238 may vary to practice the invention. The receptacle end 214, along with the card socket, are designed to ensure insertion in only one direction and one orientation such that the leads 238 will always mate with the same pins of the socket, e.g., the module 210 cannot be readily inserted upside down in a socket manufactured to PCMCIA specifications.

The PCMCIA defines four types of PC Cards and an Express Card, and the battery module 210 may be selected to comply with any of these types or the Express Card specification (or another standard other than the PCMCIA specifications). The more typical embodiments would comply with a Type I, II, or III PC Card. The specifications for these are very similar with the main difference being the thickness, t. For example, each type is 54 mm wide with a 86.6 mm length, 1, (or as shown in FIG. 2B has a height, h, of 54 mm) but a Type I PC Card has a thickness (t of FIG. 2B) of 3.3 mm, a Type II PC Card has a thickness of 5.0 mm, and a type III PC Card has a 10.5 mm thickness. With this in mind, a PC Card battery module 210 may be manufactured to comply with the specifications defined by PCMCIA for a Type II PC Card with a body 212 with a 54 mm height, h, or width, a 5.0 mm thickness, t, and a connection interface meeting the PCMCIA specifications (e.g., 68 pins configured as called for in the PCMCIA specifications). It should be noted that the specific configuration of the module 210 is not as important as that the form factor of the module 210 be useful for ready insertion via an external port, receptacle, or socket in a computer system case or housing and that connections to the batteries 232 be provided, and the inventor recognizes that complying with PCMCIA specifications is one effective technique for achieving these goals.

Another feature of the invention is that the battery module 210 can be inserted into a system that is "hot" (i.e., the module 210 is hot swappable) and without disassembling the case or housing enclosing the component that is being powered by the battery module 210. To this end, the module 210 is configured to be compatible in form factor and in functional components (e.g., connection interface 222) with a back up power assembly 310 shown in FIGS. 3A and 3B. The assembly 310 includes a card or board 312, which may take a number of forms to practice the invention such as a standard computer card or board configured for insertion within a typical PC or other computer system case, such as to the backplane (not shown) or other board. To the card or board 312, a bulkhead adapter or mating receptacle 314 is mounted which includes a rectangular opening through which a socket assembly 320 may be accessed. The bulkhead adapter 314 is typically mounted relatively flush with the bulkhead of the system case or housing (or any other surface or wall of a case or housing used provide external access to internally positioned components).

The assembly 310 further includes a socket assembly 320 which is rigidly mounted to the card 312 so as to be adjacent or at least accessible via an opening in the adapter 314. The socket assembly 320 functions to physically receive a battery module, such as module 210, and to physically release or eject such a module. Additionally, the socket assembly 320 is adapted for providing a power connection between one or more batteries in the module to a power connector 350 via lines 340. While a number of arrangements may be used to provide these functions, one embodiment of the invention utilizes a socket assembly 320 fabricated to PCMCIA specifications for sockets. For example, the socket assembly 320 may be include one or more card slots 324 for receiving one, two, or more Type I, Type II, Type III, or Type IV PC Cards or Express Cards. Typically, the socket assembly 320 is configured with a pair of PCMCIA card slots 324 for receiving a pair of Type III cards (although a Type I or Type II card can typically be inserted in a Type III slot), with the width of the opening in the adapter 314 and the width and height of the slot(s) 324 substantially matching or being larger than the thickness, t, and height, h, (or width) of the module body 212.

To provide the ejection and reception functions, the socket assembly 320 includes a socket frame 322 which defines the slot(s) 324 and contains a connection interface 326. The socket frame 322 is mounted on the card 312 and abuts the adapter 314. An arm 330 is supported on the frame 322 by mounting device 334, e.g., to slide along an adjacent surface of the frame 322. Also, an ejection member 338 is attached to the arm 330 and to an internal ejection member (not shown) in the connection interface 326. Release or ejection buttons (e.g., an end portion of the arm 330) extend outward from the adaptor 314, and during operation, a module 210 is inserted into the slot 324 and received by or coupled with the socket assembly 320 in the connection interface 326 by pins 362 in receptor 360. As the module 210 is received, the internal ejection member is pushed inboard and the ejection arm 338 rotates counterclockwise which forces the interconnected arm to slide outboard, thereby further exposing the release button 332. When it is desired to eject the module 210, the release button 332 is pressed which reverses this cycle causing the internal ejection member to push the module 210 out of the slot 324 and assembly 320. Hence, the socket assembly 320 is adapted for plugging in battery modules and ejecting such modules without requiring disassembly of a case or housing within which the assembly 310 is mounted.

The socket assembly 320 includes the connection interface 326 to mate with the connector 222 of the module and to provide power connections. In this regard, the interface 326 includes receptors 360 with pins 362 for mating with pin receptacles 216 of module 210. On the opposite side (or external to frame 322), a series of leads 328 are provided that are internally connected with pins 362. As shown, an electrical path is provided from the slot assembly via leads 328, wire or leads 340, and power connector 350, which may be printed on the board 312 or otherwise provided or mounted to board 312. The specific pins (and leads 328) chosen for transferring the battery power may vary to practice the invention. For example, but not as a limitation, pins 34, 35, and 68 as identified by PCMCIA specifications for PC Cards may be utilized, and in this embodiment, the batteries 232 would be connected to pins 34, 35, and 68 of battery module 210 and wires or connectors 340 would be connected to external leads 34, 35, 68 (shown as element 328 in FIG. 3) of connection interface 326 of socket assembly 320.

Figure 4:
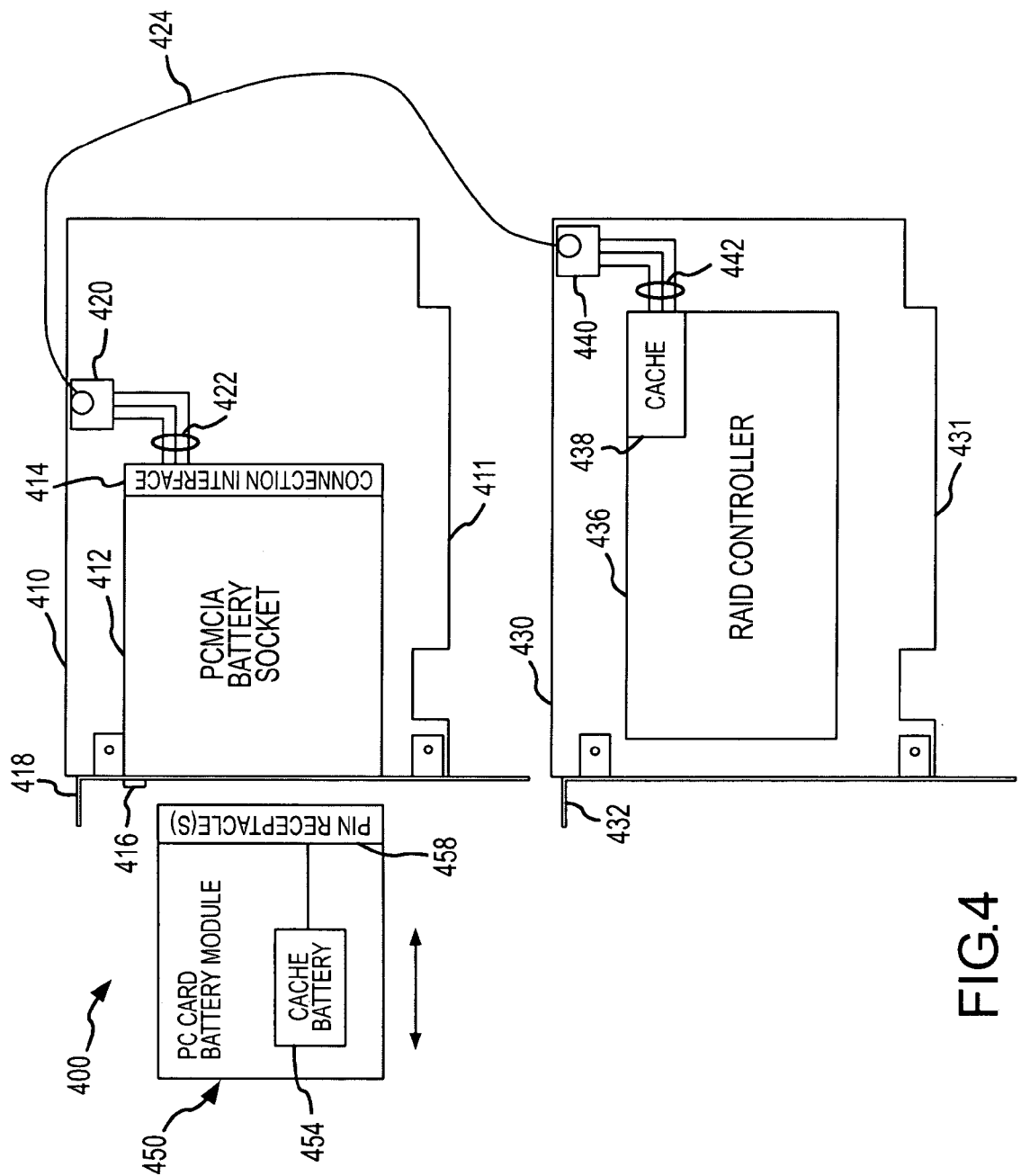
FIG. 4 illustrates an exemplary battery-backed cache system according to the present invention implemented to provide a cache battery in a RAID controller implementation in which the battery can be hot swapped and externally ejected and plugged in without disassembling a case containing the RAID controller.

The hot swap, plug in battery module and socket assembly features of the invention can be used with nearly any computer-based device that requires back up battery power. The features of the invention are, for example, well suited for providing a back up battery for a cache used by a RAID controller or other processor. FIG. 4 illustrates more specifically a RAID controller system with battery-backed cache configured according to the invention and which may be implemented with per the description provided with reference to FIGS. 1-3B.

As shown, the system 400 includes a back up power board 410, a controller board 430, and a PC Card battery module 450, which is shown to be insertable and ejectable from the system 400. On the back up power board 410, a PCMCIA battery socket 412 is mounted. The socket 412 includes a connector interface 414 that is wired via leads 422 to power connector 420 provided on the board 410. The board 410 includes a side 411 that is configured for mating with a backplane or other receiving board in a case housing the controller board 430. Further, the board 410 is fastened to the case (not shown) with bulkhead adapter 418 which has an opening for providing access to a slot in the battery socket 412 and for allowing the release button 416 to extend outward from the case and adapter 418.

The system 400 further includes a RAID controller 436 provided on controller board 430. As with the back up power board 410, the controller board 430 will typically be mounted to a backplane or similar component in the case housing the RAID controller 436, and as such, includes side 431 configured for insertion into the backplane or similar component. Also, a bulkhead adapter 432 is provided to mount the controller board 430 to the case and typically, to provide communication access to the RAID controller, e.g., a communication line is plugged into RAID controller (or an interface to RAID controller) 436 through the adapter 432. A cache 438 is provided as part of (or separately, not shown) the RAID controller 436 on the board 430. Back up power is provided to the cache 438 via lines 442, RAID power connector 440, and line 424. In one embodiment, the boards 410, 430 are positioned near or adjacent within the case (not shown) and a wire harness or the like is used to run line 424 between the boards 410, 430.

The system 400 also includes a PC Card (or Express Card or the like) battery module 450, which may be configured similarly to the module 210 of FIGS. 2A-2C. The PC Card battery module 450 is adapted to comply with the form factor specifications of PCMCIA as well as the structural and interconnection requirements set forth for PC Cards by PCMCIA, such as for a Type III card. The PC Card battery module 450 includes a cache battery 454 linked to a pin receptacle 458. The module 450 is shown ejected from the battery socket 412 but as discussed above, is inserted into or plugged into the battery socket 412 to provide back up power via line 424 to RAID controller cache 438. Again, as discussed previously, the module 450 has a form factor that allows it to be received in the standard slots provided by battery socket 412, and the module 450 can be inserted from a location external to the case housing the boards 410, 430 and can be ejected externally by pressing release button 416 without powering down the RAID controller 436 and associated systems.

In an exemplary maintenance action, the RAID controller's cache 438 may be shut down automatically or manually, the PC Card battery module 450 is ejected by pressing button 416, a new module 450 is provided and inserted (or hot swapped) into the battery socket 412, and after a successful validation that the battery 454 is ready (such as by the RAID controller 436 or another device) the cache 438 would be either automatically or manually enabled. As can be seen, the present invention allows the replacement of the battery 454 without requiring a shut down of the system 400 or requiring opening the case containing the RAID controller and removal of the controller card 430 (as was the case with prior devices). Hence, the invention significantly reduces down time for the RAID controller 436.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer system configured for hot swapping a battery module used to provide back up power to a system component, comprising:
   a housing;
   a back up power board positioned within the housing, the back up power board comprising a battery power connector;
   a processor board positioned within the housing proximal to the back up power board, the processor board comprising a back up power connector connected to the battery power connector;
   a processor mounted on the processor board;
   a system component mounted on the processor board, the system component being controlled by the processor and connected to the back up power connector;
   a socket assembly mounted on the back up power board, the socket assembly comprising a slot for receiving the battery module, a connection interface adjacent the slot, and an adapter for mating with a wall of the housing with the slot accessible from outside the housing, wherein the connection interface comprises pins for mating with a pin receptacle end of the battery module and leads connected to the battery power connector and a set of the pins; and
   wherein the socket assembly further comprises means for ejecting the received battery module from the slot including a release button protruding outward from the wall of the housing.

2. The computer system of claim 1, wherein the processor comprises a Redundant Array of Inexpensive Disks (RAID) controller and the system component comprises a cache.

3. The computer system of claim 1, wherein the battery module complies with PCMCIA PC Card or Express Card specifications for external form factor and for interconnection and comprises a battery connected to the pin receptacle end to provide battery power to the pins of the connection interface corresponding to the leads connected to the battery power connector.

4. The computer system of claim 3, wherein the slot is configured for receiving a PCMCIA PC Card or PCMCIA Express Card.

5. The computer system of claim 1, wherein the processor is adapted to monitor the received battery module for power levels, to end operation of the system component when the monitored power levels fall below a preset minimum level, and to restart operation of the system component when the monitored power levels later exceed about the preset minimum level, whereby the received battery module can be replaced without powering down the processor.

6. A battery-backed cache system, comprising:

a RAID controller; a cache controlled by the RAID controller;

a first power connector connected to the cache;

a back up power board;

a second power connector on the back up power board, the first power connector is connected to the second power connector;

a socket assembly mounted on the back up power board and connected to the second power connector, wherein the socket assembly comprises a frame defining a slot, a connection interface adjacent the slot, and an adapter for mating with a wall of a case, the slot being accessible through the wall when the adapter is mated with the wall;

a battery module comprising a body with external dimensions corresponding with the slot of the socket assembly, a battery assembly positioned within the body, and a connection interface connected to the battery assembly and configured for mating with the socket assembly connection interface, wherein the battery module is positioned within the slot of the socket assembly with the connection interfaces abutting; and wherein the socket assembly further comprises means for ejecting the battery module comprising a release button selectable from an area exterior to the wall.

7. The system of claim 6, wherein the socket assembly comprises a PCMCIA-compliant socket for receiving PC Cards or Express Cards.

8. The system of claim 6, wherein the body and the connection interface of the battery module are configured to comply with body and interface PCMCIA specifications for PC Card, Express Cards, or other cards.

9. The system of claim 6, wherein the body has a thickness of less than about 18 mm and a width of less than about 54 mm.

10. The system of claim 6, wherein the socket assembly comprises means for ejecting the battery module from the slot, the ejecting means operable concurrent with the RAID controller.

11. The system of claim 10, wherein RAID controller operates to monitor a power level of the battery assembly, to when the power level is below a low battery level terminate operation of the cache, and to determine when the power level again exceeds the low battery level and respond by restarting operation of the cache.

* * * * *